(12) United States Patent
Kithil

(10) Patent No.: US 6,794,728 B1
(45) Date of Patent: Sep. 21, 2004

(54) CAPACITIVE SENSORS IN VEHICULAR ENVIRONMENTS

(75) Inventor: Philip W. Kithil, Santa Fe, NM (US)

(73) Assignee: Advanced Safety Concepts, Inc., Santa Fe, NM (US)

( * ) Notice: Subject to any disclaimer, the term of this patent is extended or adjusted under 35 U.S.C. 154(b) by 0 days.

(21) Appl. No.: 09/914,285

(22) PCT Filed: Feb. 24, 2000

(86) PCT No.: PCT/US00/04765

§ 371 (c)(1),
(2), (4) Date: Aug. 24, 2001

(87) PCT Pub. No.: WO00/50261

PCT Pub. Date: Aug. 31, 2000

Related U.S. Application Data

(60) Provisional application No. 60/138,139, filed on Jun. 8, 1999, and provisional application No. 60/121,653, filed on Feb. 24, 1999.

(51) Int. Cl.$^7$ ............................................... H01L 29/00
(52) U.S. Cl. ...................................................... 257/532
(58) Field of Search ................................. 257/530–535

(56) References Cited

U.S. PATENT DOCUMENTS

| | | |
|---|---|---|
| 3,864,668 A | 2/1975 | Bickford |
| 3,898,472 A | 8/1975 | Long |
| 4,554,493 A | * 11/1985 | Armstrong ................ 318/444 |
| 4,796,013 A | 1/1989 | Yasuda et al. |
| 4,887,024 A | 12/1989 | Sugiyama et al. |
| 4,970,122 A | * 11/1990 | Palanisamy ................ 428/432 |
| 4,972,154 A | 11/1990 | Bechtel et al. |
| 5,118,134 A | 6/1992 | Mattes et al. |
| 5,363,051 A | 11/1994 | Jenstrom et al. |
| 5,366,241 A | 11/1994 | Kithil |
| 5,394,097 A | 2/1995 | Bechtel et al. |
| 5,512,836 A | 4/1996 | Chen et al. |
| 5,549,323 A | 8/1996 | Davis |
| 5,602,734 A | 2/1997 | Kithil |
| 5,653,462 A | 8/1997 | Breed et al. |
| 5,702,123 A | 12/1997 | Takahashi et al. |
| 5,802,479 A | 9/1998 | Kithil et al. |
| 6,014,602 A | 1/2000 | Kithil |

* cited by examiner

*Primary Examiner*—Cuong Nguyen
(74) *Attorney, Agent, or Firm*—Jeffrey D. Myers; Peacock, Myers & Adams, P.C.

(57) ABSTRACT

Capacitive sensors used to detect force upon a transparency product for detecting and discriminating crash characteristics of a vehicle, as well as capacitive sensors used in conjunction with a conductive panel functioning as an airbag cover and ground plane for the capacitive sensors. The capacitive sensors are made up of electrodes, of which one may be a conductive coating. The capacitive sensors can be arranged upon a substrate and can include a reference sensor. Long term effects of temperature upon sensor output are compensated for with an algorithm comparing constant desired sensor output to low frequency drift due to temperature effects. Moisture upon a transparency product is distinguished from a nearby object due to the capacitance sensed. A sleep detection algorithm detects when a vehicle operator is drowsy. A capacitive sensor array having a nested circle sensor and L-shaped sensors, along with a dummy sensor is used in a sunroof-equipped vehicle for sensing occupant head position.

22 Claims, 9 Drawing Sheets

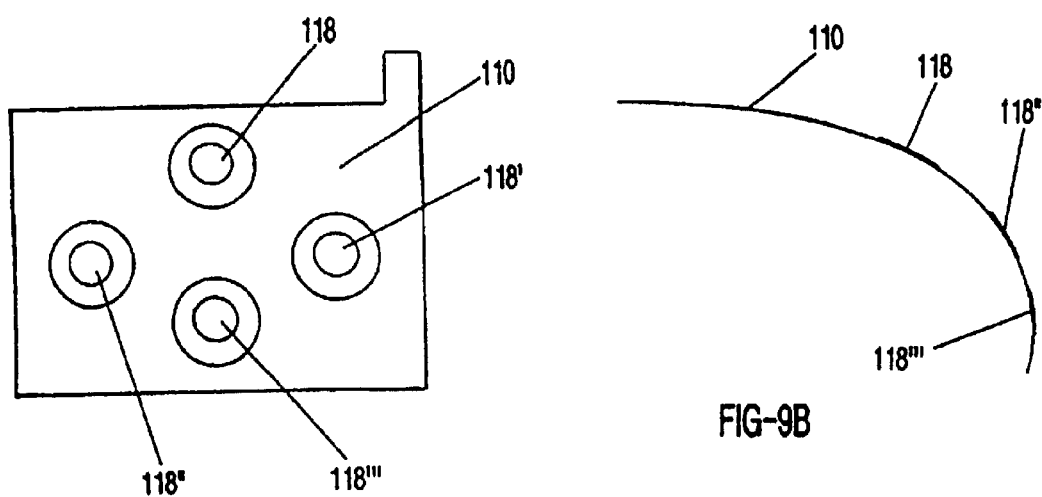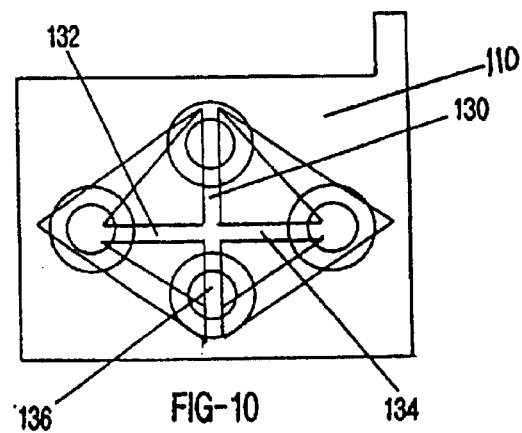

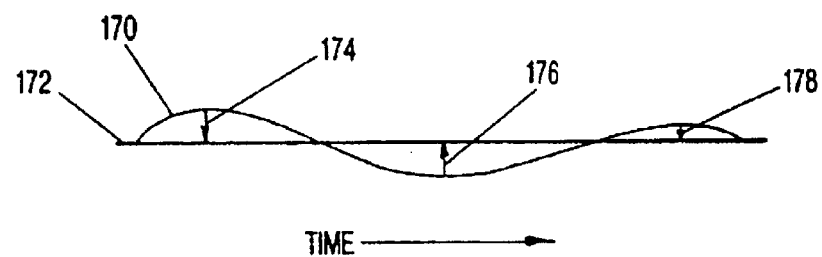
FIG-14
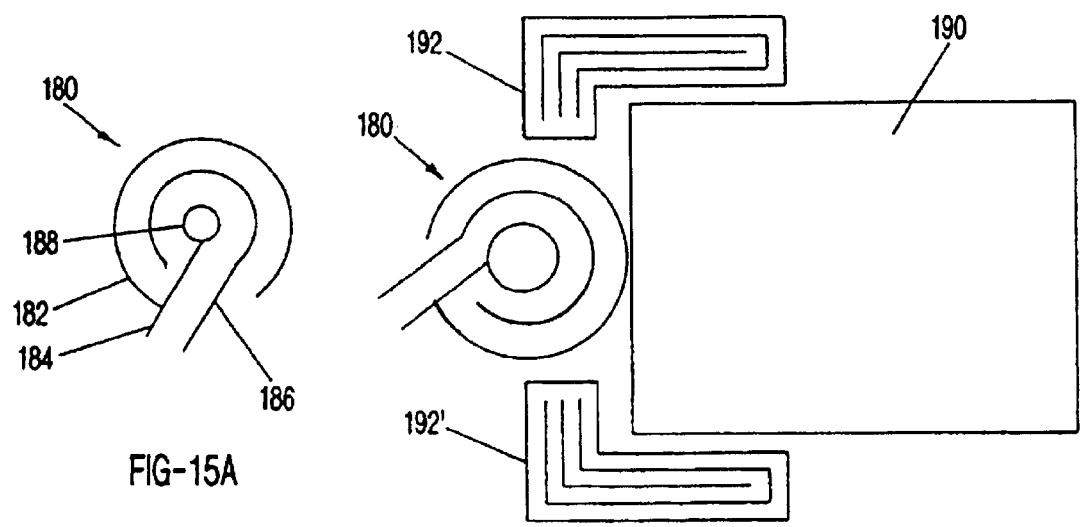
FIG-15A
FIG-15B

CAPACITIVE SENSORS IN VEHICULAR ENVIRONMENTS

CROSS-REFERENCE TO RELATED APPLICATIONS

This application claims the benefit of the filing of U.S. Provisional Patent Application Serial No. 60/138,139, entitled "Capacitive Occupant Sensor Integrated in Airbag Cover", filed on Jun. 8, 1999, and the specification thereof is incorporated herein by reference. This application also claims the benefit of the filing of U.S. Provisional Patent Application Serial No. 60/121,653, entitled "Force-Detecting Capacitive Sensor Embedded in a Transparency Product," filed on Feb. 24, 1999, and the specification thereof is also incorporated herein by reference.

BACKGROUND OF THE INVENTION

1. Field of the Invention (Technical Field)

The present invention relates to capacitive sensors, particularly those employed in automotive vehicular environments.

2. Background Art

Sensor technologies are becoming increasingly important in the development of safety and convenience features of vehicles. Because of differing vehicle geometries and extreme environmental conditions to which they are subjected, the sensors presently available are deficient in many regards.

Automobile air bag systems are a well known means of attempting to reduce the likelihood of serious injury to passengers in collisions. These systems are designed to very quickly inflate an air bag in front of a passenger during a collision, so as to hopefully prevent the passenger from colliding with hard objects in the passenger compartment interior, particularly the steering column and/or the dashboard. Such systems typically sense that the vehicle is involved in a collision, by using an accelerometer to sense sudden deceleration of the vehicle. Rapid inflation of the air bag may be obtained by electrical ignition of a pyrotechnic substance which rapidly generates a volume of gas sufficient to inflate the air bag, or by electrical opening of a valve for release of compressed gas stored in a chamber which is part of the air bag system.

The performance of an air bag system, in terms of its success or failure in preventing serious passenger injury, may be critically dependent on facts concerning the initial position and subsequent motion of the passenger, which are not made known to the system by an accelerometer which senses deceleration of the vehicle as a whole. Passenger head motion is particularly important, due to the seriousness of head injuries. For example, if the passenger is seated too far forward, or has his/her head too far forward, occupying the space into which the air bag will deploy, the passenger may be seriously injured by the deployment of the air bag intended to prevent passenger injury. So there is dearly a need for passenger position sensing apparatus, which can prevent air bag deployment when the passenger is already too far forward when the collision begins.

But even if the passenger is not too far forward at the beginning of the collision, the passenger will tend to move rapidly forward, with the passenger's head leading that motion, relative to the vehicle, as the vehicle rapidly decelerates, and will tend to move into the air bag deployment space, at least in the case of forward collisions, and may be too far into the air bag deployment space, before the completion of air bag deployment, to escape injury from the air bag deployment. There are a number of factors which may strongly influence the forward motion of the passenger, in addition to initial position, in ways which may vary markedly from one passenger to another. The relative forward motion of the passenger will depend strongly on whether the passenger has secured a seat lap belt and/or shoulder harness prior to the collision. The passenger's motion may also be influenced somewhat by the strength of any tensing up reaction the passenger has to the collision, i.e., instinctively pushing forward with the feet against the floorboard to restrain forward motion of the body. Such a protective reaction may vary greatly from one passenger to another, and may be greatly reduced or wholly absent if the collision is too sudden, so that the passenger has no time to react, or if the passenger is intoxicated or otherwise impaired. Also variation of the crash intensity by itself will cause considerable variation in passenger acceleration. So there is a need for systems which account for various positional and motion data, and analyze that information in making the yes or no decision on air bag deployment. Overhead sensors offer an advantage over those previously known systems having beam-emitting sensors located in front of the passenger, as in air bag systems with acoustic sensors mounted on the steering column, for which the beam from the sensor will at times by blocked from operating by the hands and/or forearms of the driver.

The use of capacitive sensors offers advantages over beam—emitting sensors, since each capacitive coupling sensor functions by sensing the change in the capacitance of a capacitor, caused by the nearby presence of a person, an effect which is essentially instantaneous (since propagated at light speed), rather than requiring a finite, non-negligible beam travel time as in the case of an ultrasonic position sensor, and since the capacitive coupling sensor does not require transmission and detection of a beam which might be blocked. And the use of an overhead array of capacitive coupling proximity sensors, the signals from which are analyzed by a microprocessor, allows essentially instantaneous and continuous monitoring of passenger position and motion through triangulation based on the distances of the passenger to the various sensors of the array, so that the overhead sensor array can be used to accurately and continuously determine fore—aft, diagonal, and lateral passenger motion. Since the passenger's head will be closest to the overhead sensors, this method will be particularly sensitive to passenger head motion.

The current state of the art is reflected by the following patents: U.S. Pat. No. 5,702,123, to Takahashi et al., entitled "Air Bag Apparatus for Passenger Seat"; U.S. Pat. No. 5,653,462, to Breed et al., entitled "Vehicle Occupant Position and Velocity Sensor"; U.S. Pat. No. 5,602,734, to Kithil, entitled "Automobile Air Bag Systems"; U.S. Pat. No. 5,549,323, to Davis, entitled "Plastic Air Bag Cover Having an integrated Occupant-Sensing Sensor Module"; U.S. Pat. No. 5,512,836, to Chen et al., entitled "Solid-State Proximity Sensor"; U.S. Pat. No. 5,365,241, to Kithil, entitled "Automobile Air Bag System"; U.S. Pat. No. 5,802,479, to Kithil, entitled "Motor Vehicle Occupant Sensing Systems;" U.S. Pat. No. 6,014,602, to Kithil, entitled "Motor Vehicle Occupant Sensing Systems;" U.S. Pat. No. 5,363,051, to Jenstrom et al., entitled "Steering Capaciflector Sensor"; and U.S. Pat. No. 5,118,134, to Mattes et al., entitled "Method and Apparatus for Protecting Motor Vehicle Occupants".

Capacitive sensor arrays are employed in the art for detection of persons, including for presence and position within automobiles. Further representative of the art are U.S.

Pat. No. 3,864,668, entitled "Seat Belt Warning and Ignition Interlock System", to Bickford; U.S. Pat. No. 3,898,472, entitled "Occupancy Detector Apparatus for Automotive Safety System", to Long; U.S. Pat. No. 4,796,013, entitled "Capacitive Occupancy Detector Apparatus", to Yasuda et al.; and U.S. Pat. No. 4,887,024, entitled "Person Detecting Device", to Sugiyama et al. U.S. Pat. Nos. 4,972,154 and 5,394,097, entitled "Apparatus and Method for Measuring Wood Grain Angle", and "Dielectric Sensor", respectively, to Bechtel, et al., exemplify one and two-sided fabrication of electrodes on traditional printed circuit (PC) boards.

The present invention provides apparatuses and methods addressing deficiencies in the prior art, as described in the description of the preferred embodiments, below. The present invention concerns systems for sensing characteristics of motor vehicles and occupants for purposes such as deployment of air bags during vehicle crashes, to monitor drowsy drivers, and to determine crash characteristics. More particularly it concerns systems in which the system operation is affected not only by information about the motion of the vehicle caused by crash forces, but also measured data concerning the motion of the passenger, so that the system will operate in a manner to minimize the risk of serious injury to the passenger. The present invention also incorporates a microprocessor having memory to track data and compare it to reference data, as well as an algorithm to compensate for temperature effects upon the sensors.

SUMMARY OF THE INVENTION (DISCLOSURE OF THE INVENTION)

The present invention is of a force-detecting capacitive sensor comprising at least two electrodes integral with a transparency product. At least one of the electrodes can be a conductive membrane or coating that is also integral with the transparency product. The electrodes can be in a parallel or a non-parallel configuration. The transparency product can be glass, for example a vehicle windshield.

The present invention is also a system for detecting force which imparts momentary bending to a transparency product. The system is comprised of at least one force-detecting capacitive sensor integral with the transparency product. Preferably, the sensor or sensors are configured for discriminating different vehicle crash characteristics, and preferably work in conjunction with a vehicle occupant protection system having at least one occupant restraint device.

The present invention is also a system for detecting a visibility condition of a transparency product, and the system comprises at least one capacitive sensor integral with the transparency product that is able to distinguish between a visibility condition and an object in proximity to the transparency product. Preferably, the system operates in conjunction with a vehicle occupant protection system to distinguish between a vehicle occupant in proximity to the transparency product and condensed moisture on the transparency product. Preferably, the system further initiates a response to modify the visibility condition.

The present invention is further a method of compensating for long-term affects of temperature on a sensing system. The method includes the steps of determining the constant desired sensor output; determining low frequency shifts due to temperature affects; comparing the constant desired sensor output to the low frequency shifts due to temperature affects; and employing a compensation algorithm to account for the difference.

Additionally, the present invention is a vehicle occupant detecting capacitive sensor in combination with a conductive panel functioning as a vehicle airbag door and ground plane for the capacitive sensor. Additional capacitive sensors can be included, and all of the capacitive sensors are fabricated on a substrate material adjacent to the conductive panel. Preferably, the capacitive sensors are each assigned to at least one triangle for discriminating occupant proximity and providing data to an airbag controller. Each of the capacitive sensors are preferably circular.

The present invention is still further a method of configuring a capacitive sensor and a reference sensor on a dielectric substrate, and comprises the steps of fabricating a reference sensor and a capacitive sensor on a substrate; placing a monolithic ground on a reverse side of the substrate; attaching a printed circuit board to a deleted portion of the monolithic ground; connecting the reference sensor to electronic parts on the printed circuit board; and compensating for changes in capacitive sensor output which are not related to proximity of a vehicle occupant by comparing the capacitive sensor output to the reference sensor output.

The present invention also is a method of detecting head motion indications of a drowsy vehicle operator. This method comprises the steps of representing the drowsy vehicle operator's head motion with a four-dimensional feature vector, training a feature detection network; utilizing a sleep detector to detect head motion that does not look like an alert operators head motion and does look like a feature associated with a sleep nod; customizing the sleep detector for individual vehicle operators; and identifying the operator of a vehicle and modifying sleep detector parameters based on historical data attributable to the identified operator.

The present invention is further still a capacitive occupant sensing system for a sunroof-equipped vehicle to monitor an occupant's head position. The system consists of a nested circle capacitive sensor and at least one L-shaped capacitive sensor surrounding the nested circle capacitive sensor, and both the nested circle capacitive sensor and the L-shaped capacitive sensor are located adjacent the sunroof. Optionally, the system further comprises a dummy sensor located on the opposite side of the sunroof from the nested circle capacitive sensor and the L-shaped capacitive sensor. A method of sensing the occupant's head position in the sunroof-equipped vehicle with a dummy sensor and a nested circle capacitive sensor array comprises the steps of positioning a dummy sensor on an opposite side of the sunroof from the nested circle capacitive sensor array adjacent the sunroof; deriving a composite head position from the dummy sensor head position and the triangulated head position from the nested circle capacitive sensor array; identifying the operator by comparing the head coordinates of the operator to historical data attributable to the identified operator; and updating parameters which identify non-impairment conditions of the operator.

A primary object of the present invention is to provide capacitive sensing arrays and systems for detecting force upon a transparency object, for sensing occupant head position, for determining vehicle crash characteristics, and for operating in conjunction with a vehicle occupant safety system.

Another object of the present invention is to provide a means for a reference sensor to be near a capacitive sensor.

Still another object of the present invention is to provide an electrode for capacitive sensing made from a conductive coating.

Yet another object of the present invention is to combine a capacitive sensor with a conductive panel that functions as a vehicle airbag door, as well as a ground plane for the capacitive sensor.

Yet still another object of the present invention is to provide a detection algorithm for detecting head motion indications of a drowsy vehicle operator specific to individual operators.

A primary advantage of the present invention is that a can distinguish between moisture upon a transparency product and an object near a transparency product.

Another advantage of the present invention is that is compensates for long-term temperature effects upon sensors.

Another advantage of the present invention is that it identifies a vehicle operator and adjusts vehicle safety systems to be specific to the identified operator.

Yet another advantage of the present invention is that it defines a capacitive sensor array, including a dummy sensor, that is effective in detecting an occupant's head position for a sunroof-equipped vehicle.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIGS. 9a and 9b show a plan view and a side view, respectively, of four circular sensors fabricated on substrate material in accordance with the present invention;

FIG. 10 shows an assignment of the sensors of FIGS. 9a and 9b to triangular sets in accordance with the present invention;

FIG. 14 shows the long-term drift of capacitive signals due to temperature effects for a vehicular sensor;

FIGS. 15a and 15b show a nested circle sensor and its application in an array for a sunroof-equipped vehicle in accordance with the present invention;

DESCRIPTION OF THE PREFERRED EMBODIMENTS (BEST MODES FOR CARRYING OUT THE INVENTION)

In a first embodiment, the present invention is comprised of two or more electrically conductive elements ("electrodes") formed integrally on or within a transparency product, such as glass, a window, or a vehicle windshield. In addition to conventional electrodes, a conductive membrane or coating is also an electrode. These electrodes develop a mutual capacitance which is affected by a force acting against the transparency product. The change of capacitance between two electrodes, or between an electrode and a conductive membrane or coating acting as an electrode, is herein referred to as "capacitive sensing." Two electrodes, or an electrode and a conductive coating, are referred to as a "capacitive sensor."

Figure 1:
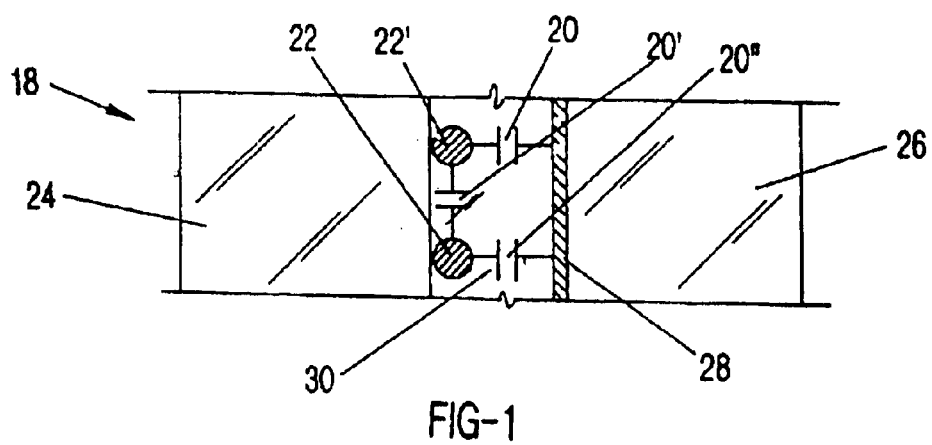
FIG. 1 is a cross-sectional view of embedded electrodes and conductive coating for capacitive sensing embedded in a transparency product in accordance with the present invention.
Figure 2:
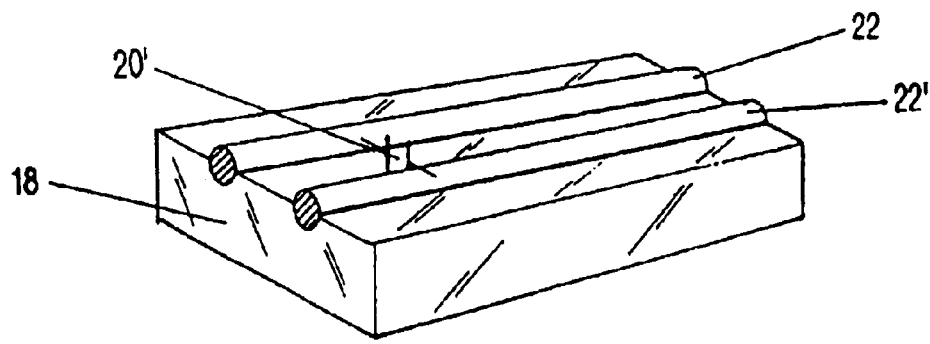
FIG. 2 shows a perspective view of multiple electrodes for capacitive sensing applied to the surface of a transparency product in accordance with the present invention.

FIG. 1 shows a cross-sectional view of transparency product 18, such as a window or windshield, with embedded electrodes 22 and 22', and conductive membrane or coating 28 therein. Electrodes 22 and 22' have capacitance 20'. Electrodes 22 and 22' can respectively have capacitance 20" and 20 with conductive membrane or coating 28. Inner transparency product layer 24 and outer transparency product layer 26 sandwich electrodes 22 and 22' and conductive coating 28. Laminating material 30 is adjacent electrodes 22 and 22' and conductive coating 28. FIG. 2 shows a perspective view of electrodes 22 and 22' applied to the surface of transparency product 18 and having mutual capacitance 20' between them.

Figure 3:
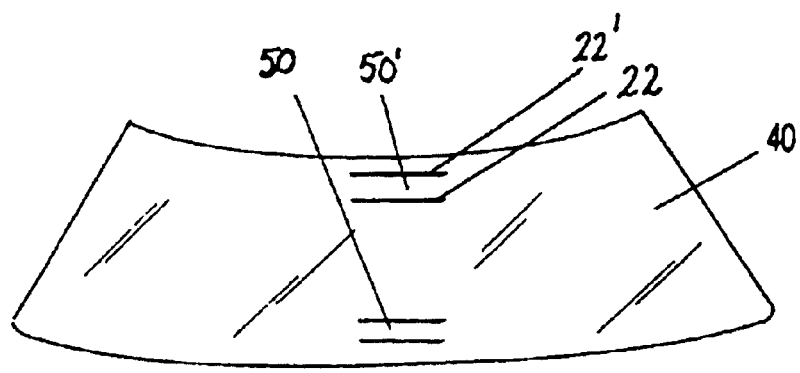
FIG. 3 shows multiple parallel electrodes for capacitive sensing in a vehicle windshield in accordance with the present invention.
Figure 4:
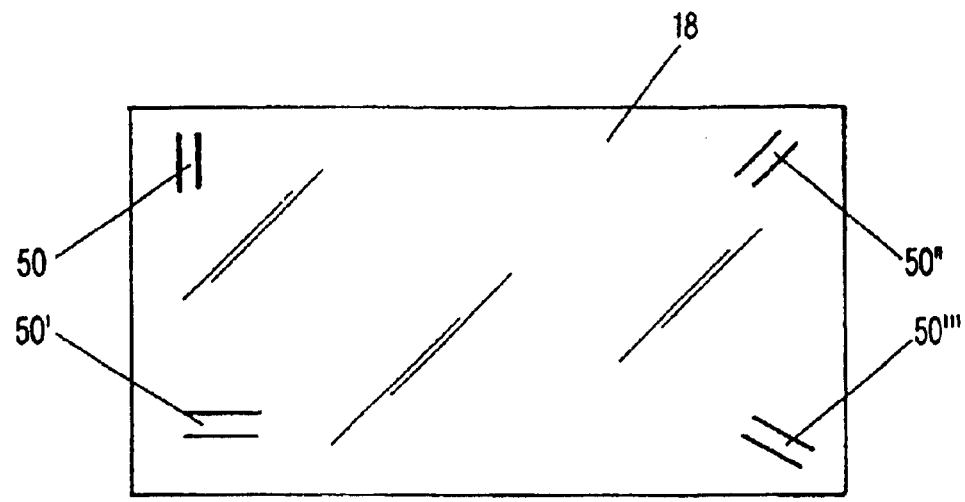
FIG. 4 shows multiple non-parallel electrode pairs for capacitive sensing inside a transparency product in accordance with the present invention.

Of course, multiple electrodes can be formed on the transparency product. The transparency product is shown as vehicle windshield 40 in FIG. 3, which is comprised of laminated glass containing a conductive membrane or coating which acts in conjunction with one or more electrodes such as 22 and 22'. While two electrode sets (or capacitive sensors) 50 and 50' are shown in FIG. 3, multiple sets of electrodes can be formed on or in a transparency product, or windshield 40. The axes of any two electrode sets embedded in or applied to a transparency product can be parallel (as shown in FIG. 3) or non-parallel (as shown in FIG. 4).

These capacitive sensors integral with a transparency product can be used as a system for detecting force which imparts momentary bending to the transparency product. In such a system, the sensor or sensors are configured for discriminating different vehicle crash characteristics. This system for detecting force can further include and operate in conjunction with a vehicle occupant protection system that has occupant restraint device(s).

When a force acts against the transparency product, the juxtaposition of an electrode such as 22 relative to any other electrode such as 22', and/or the juxtaposition of any electrode relative to conductive membrane or coating 28, is momentarily changed. This change causes a change in capacitance that exists between the electrodes or between an electrode and the conductive membrane or coating. The change in juxtaposition is caused by momentary bending or vibration of the transparency product.

The change in capacitance can be used to discriminate different vehicle crash characteristics, by portraying the characteristics of the force which acted upon the transparency product, for instance, amount of force, direction of force, duration of force, and combinations thereof. These characteristics may be utilized in a crash detection system for vehicle restraint systems, to discriminate the type and severity of crash, type of object impacted, direction of impact, percentage of vehicle structure involved in the crash, etc.

Multiple electrodes may be integrated in transparency product 18, or windshield 40, to further refine the discrimination capabilities. For example, capacitive sensors 50, 50', 50" and 50'" can be positioned in each corner of windshield 40, thereby giving four spatially distributed points of reference for crash detection and discrimination as shown in FIG. 5.

Figure 6A:
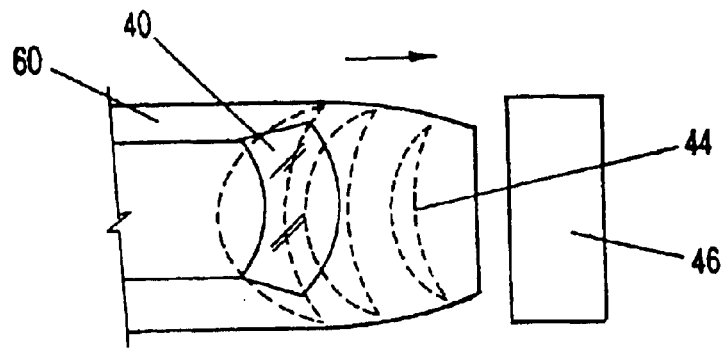
FIGS. 6a–6c show an overhead view of a vehicle and the crash discrimination capabilities of force-detecting electrodes for capacitive sensing in the vehicle windshield according to the present invention.
Figure 6B:
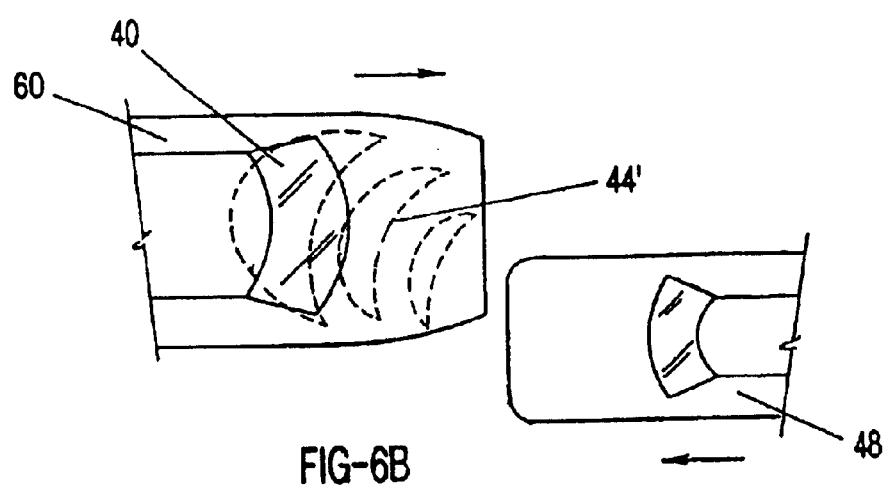
Figure 6C:
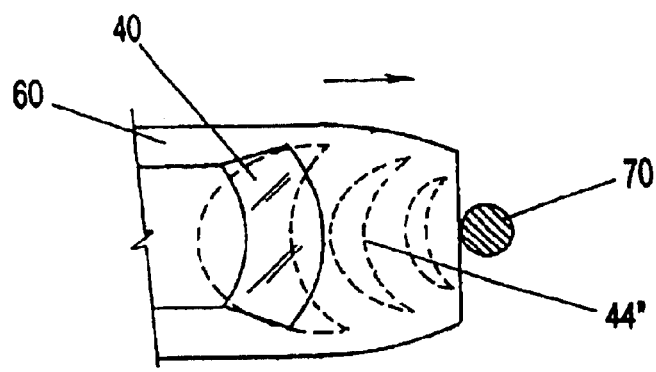

Attention is now turned to FIGS. 6a–6c showing a top view of vehicle 60 traveling to the right and impacting objects. FIG. 6a is an example of a frontal crash event with object 46 generating crash pulse 44 which radiates through vehicle 60, front-to-back, shown by dashed lines. FIG. 6b shows an example crash pulse 44' resulting from an off-center impact with another vehicle 48. FIG. 6c shows an example crash pulse 44" resulting from an impact with object 70 such as a tree or pole. The characteristics of crash pulse 44, 44', and 44" represent the effect of the impact on vehicle velocity, often referred to as delta-V. This, in large part, is a function of type of object impacted, vehicle structural rigidity, vehicle and impacted object velocities, percentage of overlap of the vehicle and impacted object, etc.

Figure 5:
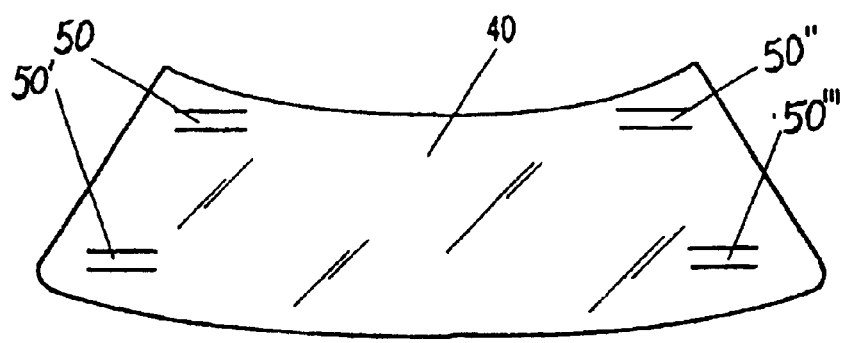
FIG. 5 shows force-detecting electrodes for capacitive sensing located in each corner of a vehicle windshield in accordance with the present invention.

By reference to crash pulse 44, 44', and 44", characteristics detected by the spatially distributed electrodes upon windshield 40, such as shown in FIG. 5, the rate of deceleration of the vehicle may be calculated, angle of impact determined, percentage of vehicle overlap with the impacted object, and other useful information can be gained about the type of object hit. This data can be employed to optimize the vehicle occupant protection systems, for example, by adjusting the timing and amount of restraining forces generated by devices such as retractable seat belts, airbags, etc.

The first embodiment of the present invention is applicable to equivalent constructions, methodologies, and applications, including the following: 1) detecting glass deflection as an indication of possible intrusion, such as a burglary attempt; 2) detecting glass deflection as an indication of potential breakage, such as the effect of a strong windstorm on plate glass used in buildings; 3) forming the electrodes on a surface of a transparency product; 4) integrating the electrodes in or on multiple discrete transparency products, such as front and rear vehicle windows; and 5) employing equivalent devices spatially distributed on the windshield or other transparency product, to provide multiple points of detection of a crash pulse, such as accelerometers or strain gauges.

Conductive membrane or coating 28 depicted in FIGS. 1 and 11 (discussed below) and discussed herein can be suitable visually-transparent electroconductive coatings that can be used or are present with the windshield substrate including those with one or more coating layers. As used herein "coating layer(s)" or "layer" includes one or more coating films or films. The coating layer or layers can be part of a "coating stack" or "stack" which includes one or more coating layers and/or coating films. Suitable electroconductive coating layer(s) such as metal layers with or without metal oxide and/or dielectric layers include the type present in products sold by Pittsburgh Plate Glass Industries (PPG) under its registered trademark SUNGATE®.

However, as will be appreciated by those skilled in the art, the present invention is not limited thereto and may be used over any type of coating layers. For instance tin oxide coated glass substrates, commercially available from PPG, may be advantageously employed herein. Also, substantially transparent conductive coated flexible substrates, such as ITO deposited onto substantially clear or tinted MYLAR®, may be used. Materials suitable for forming the electroconductive coating layer are well known to those skilled in the art including inorganic, organic, or blends and composites of inorganic and organic electrochemically active materials. Exemplary conducting materials are coatings of doped indium oxide, doped tin oxide, doped zinc oxide and the like, as well as all thin metallic coatings that are substantially transparent, such as those of gold, silver, aluminum, nickel alloy, and the like and those such as $WO_3$, $V_2O_5$, $MoO_3$, $Nb_2O_5$, $TiO_2$, $CuO$, $Ni_2O_3$, $Ir_2O_3$, $Cr_2O_3$, $Co_2O_3$, $Mn_2O_3$, and the like. Also one or more optional intermediate layers may be deposited between the metal layer and any dielectric layer.

It is also possible to employ multiple layer coatings, such as SUNGATE® and as taught in U.S. Pat. No. 4,806,220, to Finley, entitled "Method of Making Low Emissivity Film for High Temperature Processing," the teachings of which are hereby incorporated by reference. Others include those of the following: U.S. Pat. No. 4,786,563, to Gillery, et al., entitled "Protective Coating for Low Emissivity Coated Articles;" U.S. Pat. No. 4,610,771, to Gillery, entitled "Sputtered Films of Metal Alloy Oxides and Method of Preparation Thereof;" U.S. Pat. No. 4,716,086, to Gillery, et al., entitled "Protective Overcoat for Low Emissivity Coated Article;" and U.S. Pat. No. 4,898,789, to Finley, entitled "Low Emissivity Film for Automotive Heat Load Reduction," all hereby incorporated by reference.

A suitable SUNGATE® coating is one that is electrically conductive and is not adversely affected by temperatures up to about 1300 degrees F (704 degrees C) for several minutes. Windshields and windows with SUNGATE® coatings can consist of a stack of the metallic and dielectric films sandwiched between two glass plates. Other coatings that may be used in the practice of the invention are taught in U.S. Pat. No. 4,201,649, to Gillery. entitled "Low Resistance indium Oxide Coatings," which teachings are hereby incorporated by reference. Also suitable are conductive coated glass comprising a multi-layer thin film structure, which includes a thin coating of fluorine-doped tin oxide with additional undercoating thin film layers disposed between the fluorine-doped tin oxide layer and the underlying glass substrate. Such a multi-layer coating stack is made from an on-line (preferably in-bath) pyrolytically-coated (preferably by chemical vapor deposition) float glass. The layers undercoating the doped tin oxide typically comprise a silica/silicone layer and a tin oxide layer. Also suitable is the transparent conducting coating layer used in this invention of a thin layer of ITO (In2O3 containing preferably approximately 5 to 20 mole percentage of SnO2). Typically, conducting coating layers are disposed on a substrate of glass or plastic as a coating having a thickness in the range of about 5 nm to about 10,000 nm, and preferably about 10 nm to about 1,000 nm. However, any thickness of the conducting coating layer may be employed that provides adequate conductance and which does not appreciably interfere with the transmission of light where required.

Such coating layers can be applied to visually transparent substrates by any method known to those skilled in the art. For instance substrates can have a sputtered coating stack although MSVD coatings and pyrolytic coatings can also be used. For sputtered coating the substrate may be made of any material, e.g., plastic, glass, metal or ceramic. In the practice of this invention, the substrate is preferably transparent, e.g., nylon, glass or a Mylar® plastic sheet. Preferably the substrate is glass. The glass may be of any composition having any optical properties, e.g., any value of visible transmittance, ultraviolet transmission, infrared transmission and/or total solar energy transmission. Types of glasses that may be used in practice of the invention, but not limited thereto, are disclosed in: U.S. Pat. No. 4,746,347, to Sensi, entitled "Patterned Float Glass Method;" U.S. Pat. No. 4,792,536, to Pecoraro, et al., entitled "Transparent Infrared Absorbing Glass and Method of Making;" U.S. Pat. Nos. 5,240,886 and 5,385,872, to Gulotta, et al., entitled "Ultraviolet Absorbing, Green Tinted Glass;" and U.S. Pat. No. 5,393,593, to Gulotta, et al., entitled "Dark Gray, Infrared Absorbing Glass Composition and Coated Glass for Privacy Glazing." the disclosures of which are hereby incorporated by reference.

The sputtered coating stack may have any arrangement including, but not limited to, a base layer also referred to as a dielectric layer, a phase matching layer or an antireflective layer; an electroconductive metal layer usually a silver film but may be any noble metal; a primer or protective layer which may be, but not limited to, a deposited stainless steel film, a deposited copper film or a deposited titanium film and a second dielectric layer or antireflective layer. Coating stacks that are single silver film coating stacks that may be used in the practice of the invention, but not limiting to the invention are disclosed in: U.S. Pat. No. 4,320,155, to Gillery, entitled "Method for Coating an Article to Alternately Reflect and Absorb Solar Energy;" U.S. Pat. No. 4,512,863, to Criss, et al., entitled "Stainless Steel Primer for Sputtered Films;" U.S. Pat. No. 4,594,137, to Gillery, et al., entitled "Stainless Steel Overcoat for Sputtered Films;" and U.S. Pat. No. 4,610,771, supra. The disclosures of the patents are hereby incorporated by reference.

For SUNGATE® coated glass, the layers are zinc stannate; the primer layer is deposited as metallic copper and the electroconductive layer is silver. The primer layer is preferably deposited on the air surface of a glass sheet cut from a float glass ribbon. The air surface is the surface opposite the surface of the float ribbon supported on the molten pool of metal e.g. as disclosed in U.S. Pat. No. 4,055,407, to Heithoff, et al., entitled "Apparatus for the Manufacture of Flat Glass Having a Glass Refractory Delivery Piece and Method of Installation." The coating stack described above is disclosed in the above-mentioned U.S. Pat. Nos. 4,610, 771 and 4,786,563, supra. The protective layer is deposited over the coating stack.

Another useful coating stack carried on the substrate can include a base layer which may include one or more films of different dielectric materials or antireflective materials or phase matching materials, a first electroconductive metal layer, a primer layer to prevent degradation of the metal layer during sputtering of a dielectric layer or antireflective layer or phase matching layer. The dielectric layer may have one or more films. A second electroconductive metal layer can be deposited over the phase matching layer. A second primer layer can be deposited on the second metal layer and a dielectric layer or antireflective layer can be deposited over the second primer layer. Suitable double metal layer coating stacks include the type disclosed in U.S. Pat. No. 5,821,001 to Arbab et al. entitled "Coated Articles" which is hereby incorporated by reference, and in products sold by PPG industries, inc., under its trademark SUNGATE® coated glass.

Applicant's pending PCT patent application Ser. No. US98/15505, entitled "Capacitive Sensing in Vehicles," disclose a capacitive sensor, made up of electrodes, embedded in an automotive windshield, to detect proximity of an occupant adjacent to a nearby airbag system and to disable or modify the output of the airbag system if an occupant is in a dangerously close position. The sensor relies on the physics of mutual capacitance caused to exist between the electrode pair.

In a second embodiment of the present invention, a capacitive sensor or sensors are used in a system for detecting a visibility condition of a transparency product. The system distinguishes between a visibility condition and an object in proximity to the transparency product and the system can operate in conjunction with a vehicle occupant protection system to distinguish between a vehicle occupant in proximity to the transparency product and a visibility condition. The system further initiates a response to modify the visibility condition.

Transparency products, such as windshields, are also subject to diminished visibility conditions from the presence of condensing moisture on the interior or exterior surface. The condensing moisture can be either in liquid form, such as condensed fog or rain drops, or in solid form, such as frost, snow or ice. In a second embodiment, the present invention is also a system for detecting a visibility condition of a transparency product and initiating a response to modify the visibility condition. In this embodiment a capacitive sensor is integral with, such as embedded in or on, a transparency product 18, or windshield, and detects the condensed moisture and initiates a countermeasure such as a fan to direct air against the windshield surface, a heater/defroster to melt ice or frost, windshield wiper action, etc.

Figure 11:
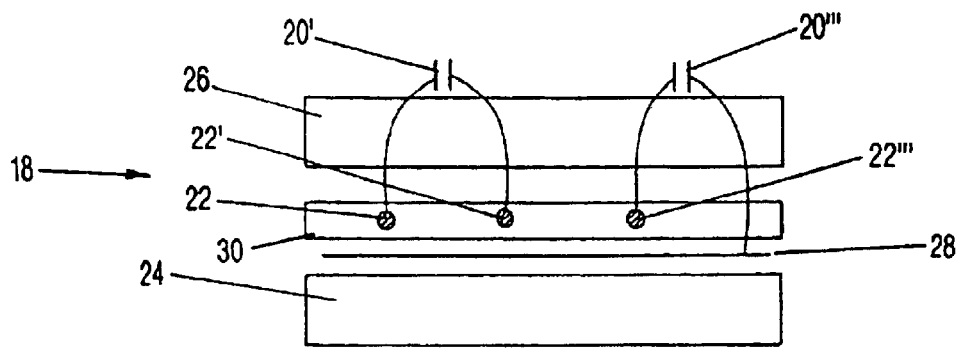
FIG. 11 shows an alternative embodiment of capacitive sensors and conductive coating embedded in a transparency product in accordance with the present invention.

Attention is now turned to FIG. 11. The sensor shown is comprised of either two electrodes 22 and 22' forming a capacitive sensor with capacitance 20', or a single electrode 22'" which forms a capacitive sensor with conductive coating 28 applied to the transparency product to form capacitance 20'" as shown in FIG. 11. In either case, the electrodes or coating may be applied to an internal or to an external surface of transparency product 18, or windshield 40 (as shown in FIGS. 3, 5 and 6). FIG. 11 depicts the case of the electrode(s) and coating applied to an internal surface of transparency product 18.

The capacitive sensor of the second embodiment of the present invention can be configured to differentiate an occupant who is touching the transparency product, or windshield, from condensed moisture on the transparency product, or windshield. The physical principle underlying the differentiation relates to the sensor response for an object which is capacitively coupled to the vehicle frame versus sensor response for an object which is not coupled to the frame. A capacitively coupled object represents an occupant, and an uncoupled object represents condensed moisture on the glass.

For the occupant case, the sensor capacitance (assuming nominal electrode spacing in the range of 0.375" to 1.5", and an amplitude-modulated signal using a charge-sensitive amplifier topology) typically exhibits an exponential shape with the capacitance decreasing to a minimum value as the occupant approaches and touches the glass. This is attributable to the mutual capacitance shielding effect caused by the positioning of the occupant with respect to the electrode pair. The occupant's highly conductive outer skin layer becomes a shunt pathway to the vehicle frame for the field energy.

Figure 12:
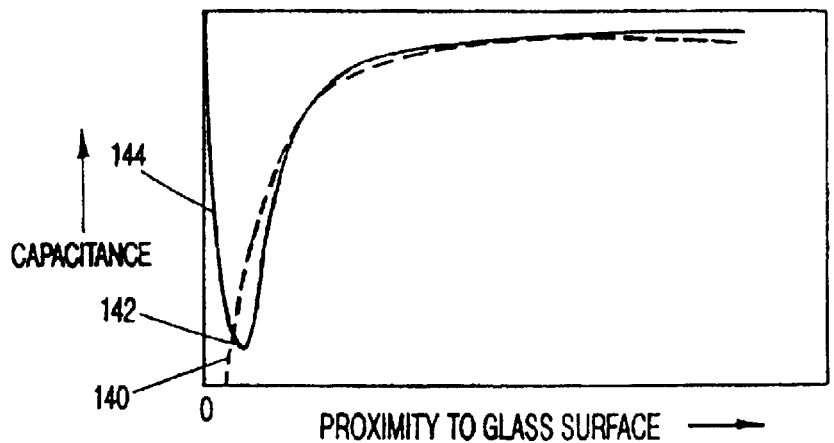
FIG. 12 shows a graphical representation of capacitance versus proximity to a windshield, or glass, surface in accordance with the present invention.

For the condensing moisture case the sensor capacitance under the same assumptions exhibits a maximum capacitance because the moisture layer on the glass has no shunt pathway, and therefore the moisture becomes capacitively coupled to the driven electrode and amplifies the oscillating drive signal. This signal exceeds the input specification of the charge sensitive amplifier thereby causing a saturated condition, in turn outputting a signal indicating maximum capacitance. FIG. 12 shows the relationship between capacitance and proximity to a glass windshield surface. The reversal points for the ungrounded case is shown at 142. Moisture upon the windshield is represented by plot 144. The occupant case is represented by plot 140. As is well understood in the art, the signal processing architecture which converts capacitance to voltage can invert the signals, so that the moisture on glass case exhibits a minimum output voltage and the occupant case exhibits a maximum output voltage.

A windshield-embedded sensing system designed to detect an occupant adjacent to a nearby airbag, must notify the airbag controller if a blocked sensor condition is detected. This can happen if condensing moisture is on the windshield surface. Because the sensor capacitance reaches a maximum value if moisture in on the glass, versus a minimum value if an occupant is close to or touching the glass, the airbag controller can distinguish the two cases and cause the airbag system to respond appropriately, for example bypassing the logical input from the momentarily blocked sensor.

Furthermore, once the blocked sensor condition is detected it can be alleviated by automatically activating the defroster and/or blower units in the vehicle. When the condensed moisture has sufficiently evaporated, the sensor response quickly changes from the maximum signal level associated with the condensed moisture. This data is monitored by the airbag controller and the airbag system reverts to its normal mode of operation with respect to occupant detection.

In a third embodiment, the present invention is a capacitive occupant sensor integral with an airbag cover containing a rigid or semi-rigid conductive panel. The conductive panel serves at least two purposes: 1) upon initial expansion of the airbag, one or more edges of the panel act in a cutting manner to form an opening through the foam or plastic covering material which covers the panel; and 2) the conductive panel serves as a ground plane for the capacitive occupant sensor which is sandwiched between the panel and the outer (visible) surface of the airbag cover. The ground plane shields the capacitive sensor from electronic interference that may couple to the sensor electrodes from sources such as engine electronics, and shields the capacitive fields from extending into the airbag unit, thus reducing sensitivity to road or engine vibration which may be transmitted into the airbag unit.

Figure 7A:
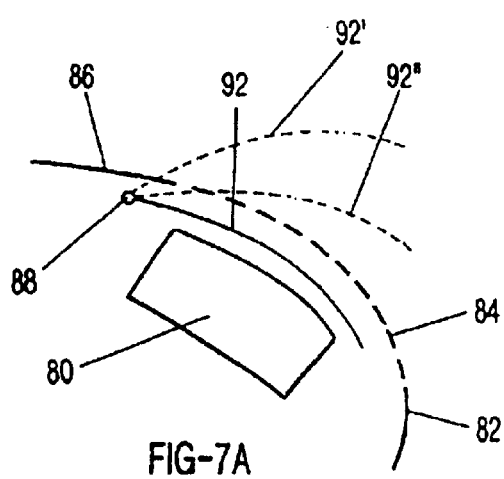
FIGS. 7a and 7b show a side view and frontal view, respectively, of a rigid or semi-rigid conductive panel functioning as an airbag door for vehicles.
Figure 7B:
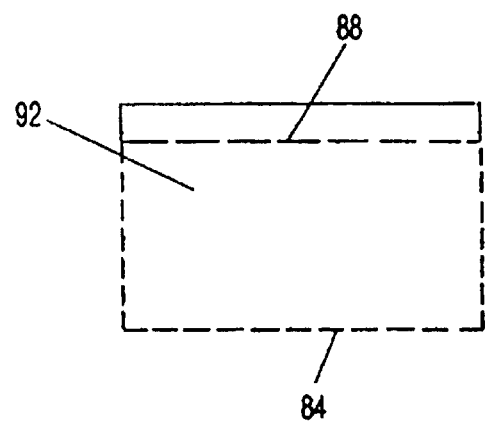
Figure 7C:
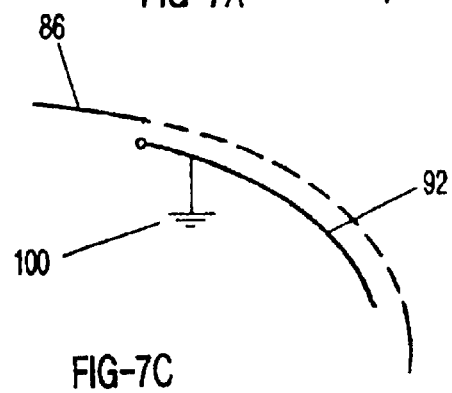
FIGS. 7c and 7d show a side view and frontal view, respectively, of a rigid or semi-rigid conductive panel functioning as a ground plane for the capacitive sensor of the present invention.
Figure 7D:
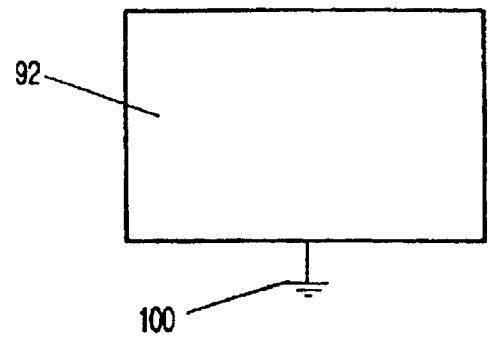

Attention is now turned to FIGS. 7a–7d. FIGS. 7a–7d show rigid or semi-rigid conductive panel 92 functioning as an airbag door and as a ground plane for a capacitive sensor or sensors. FIG. 7a shows a side view of conductive panel 92 adjacent vehicle instrument panel 82. Airbag deployment causes conductive panel 92 to cut through covering material 86, that is foam or plastic, in the area generally referred to as 84 by dashed lines. Airbag module 80 is behind vehicle instrument panel 82. Hinged portion 88 of conductive panel 92 allows conductive panel 92 to move upward to positions shown as 92' and 92". FIG. 7b shows a frontal view of conductive panel 92 showing the cut edges of covering material by dashed lines at 84. Hinged portion 88 of conductive panel 92 is shown at the top. FIG. 7c shows conductive panel 92 as a ground plane for a capacitive sensor. Conductive panel 92 is connected to ground 100. FIG. 7d shows a frontal view of conductive panel 92 grounded. In this third embodiment, multiple capacitive occupant sensors can be adjacent to conductive panel 92, thereby providing to an airbag controller multiple types of proximity, position, and motion data according to the characteristics of the occupant who is sensed.

In the third embodiment of the present invention, wherein a sensor is integral with conductive panel 92, the capacitive sensor, or sensors, is comprised of at least two adjacent electrodes formed against and electrically isolated from the panel preferably embedded between covering material 86 and conductive panel 92. Assuming a single sensor is used made up of two electrodes, one electrode is connected to a driving means, such as an oscillator, with drive electrode and the other electrode receives signals, the sense electrode, which detects the mutual capacitance caused to exist due to capacitive coupling between the two or more electrodes. One means of isolating the electrodes from the panel is to form the electrodes on one surface of a non-conducting substrate material which is adhered to the conductive panel. The substrate material may be flexible to allow conformance to curvatures in the panel. Also, the substrate material may provide for a die-cut connecting portion (such as described in applicant's U.S. Pat. No. 5,844,486, entitled "Integral Capacitive Sensor Array") with sufficient length to reach an application-specific integrated circuit (ASIC). This can be achieved by passing the connecting portion through a gap in the conductive panel to reach the integrated circuit connecting points, which are located on the opposite side of the panel from the substrate.

Figure 8A:
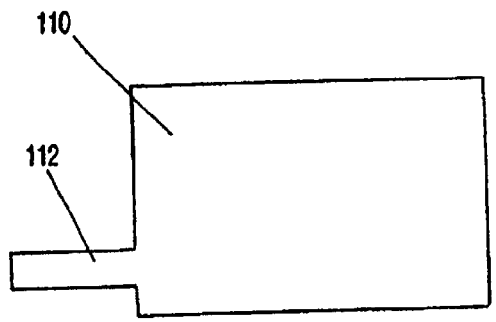
FIGS. 8a and 8b show a plan view and a side view, respectively, of a substrate with a diecut connecting tail for mounting capacitive sensors in accordance with the present invention.
Figure 8B:
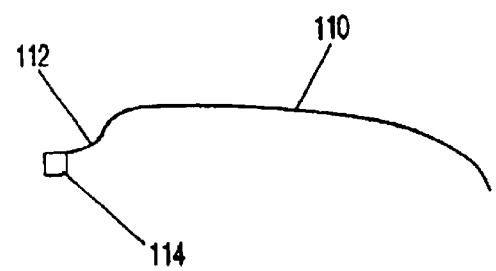
Figure 8C:
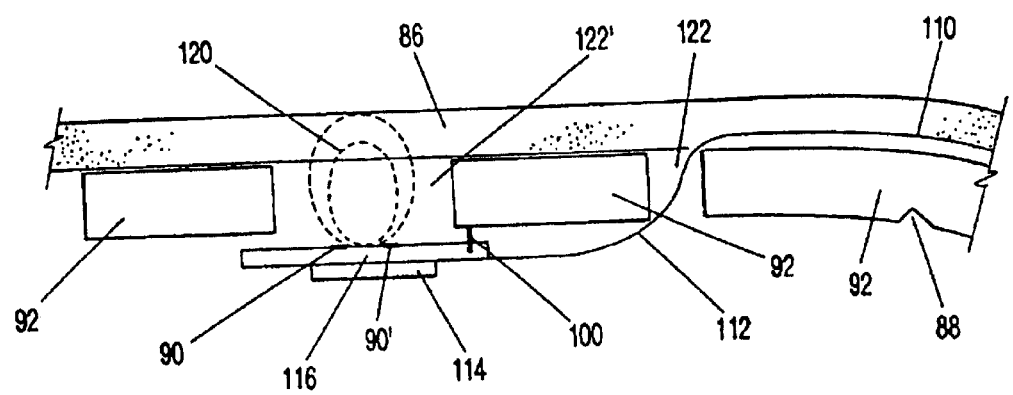
FIG. 8c shows the substrate of FIGS. 8a and 8b with the connecting tail passing through an opening in the conductive panel and connecting to an ASIC with a reference sensor constructed on a printed circuit board on which the ASIC is mounted in accordance with the present invention.

Substrate 110 is shown in FIGS. 8a and 8b, not to scale. Diecut connecting "tail" 112 is shown connecting to ASIC 114 in FIG. 8b. FIG. 8c shows a side view of connecting tail 112 as it passes through an opening 122 in conductive panel 92 and connects to ASIC 114, as well as an optional reference sensor formed by electrodes 90 and 90' constructed on the opposite side of printed circuit board 116 to which ASIC 114 is mounted. Diecut connecting tail 112 of capacitive sensor substrate 110 is shown passing through opening 122 in conductive panel 92. Ground 100 is connected between conductive panel 92 and printed circuit board 116. An additional opening through conductive panel 92 is shown at 122' and is where reference capacitive coupling fields 120 exist, as well as into covering material 86.

The sensor exhibits a decrease in electrode capacitive coupling when a highly conductive object, such as a person's body, enters the fields and shields a portion of the mutual capacitance. The shielding effect correlates to proximity of the conductive object to the sensor electrodes.

In an alternative third embodiment of the capacitive sensor, the sensor is comprised of one electrode and a driven shield, such as described in U.S. Pat. No. 5,166,679 (Vranish et.al.), such that the highly conductive object which enters the capacitive field forms a second electrode of the capacitor, causing capacitive coupling to increase when the object moves closer. In this embodiment, conductive panel 92 comprises the driven shield.

The capacitive sensor driving means and the signal processing and analysis means for the received signals, are integrated in ASIC 114 which optimally is located adjacent to hinged portion 88 of panel 92. Hinged portion 88 allows the remaining one or more edges to rotate outward due to the rapid expansion force of airbag 80 as discussed above. This location for ASIC 114 is preferred so it is not detached from panel 92 by rapidly expanding airbag 80 (not shown in FIG. 8c). A further benefit is gained if ASIC 114 avoids contact with airbag 80, thus preventing abrasion or cutting of the airbag fabric which could weaken the airbag integrity and lead to structural failure. Non-contact can be achieved by positioning ASIC 114 remote from the airbag fabric, or by covering it with a smooth material such as plastic or glue, etc.

ASIC 114 is preferably attached to printed circuit board 116 which provides connecting means for the two or more electrodes of the capacitive sensor or sensors, and for ground. Additionally, printed circuit board 116 may contain on one surface a reference capacitive sensor comprised of electrodes 90 and 90'. The function of the reference capacitive sensor is to create reference capacitive coupling fields 120 of very short range, nominally ¼", which are oriented into the foam or plastic covering material 86. The reference sensor is sensitive to the relative conductivity and/or changes in thickness of the covering material, caused for example by changes in temperature with respect to time of covering material 86. By means of comparison which includes signal subtraction or division, such changes in the foam or plastic material may be compensated for. In another embodiment, the reference sensor may be formed on the substrate along with the capacitive sensor, in either case functionally positioned to detect changes in conductivity or thickness of the foam or plastic covering material.

In the preferred third embodiment, multiple sensors are fabricated on substrate 110, adjacent to conductive panel 92 (see FIG. 9a). Four sensors 118, 118', 118", and 118'" comprised of circular electrode pairs is one way of accomplishing this. The circular electrode arrangement provides generally hemispheric sensing fields, so that a person moving into a sensing field from a non-orthogonal angle causes a change in capacitance approximately equal to a person moving into the sensing field from an orthogonal angle (orthogonal being defined as relative to the face of the sensor). Sensors 118, 118', 118", and 118'" need not necessarily be perfectly circular, other shapes such as oval, can be used in accordance with the present invention. Substrate 110 is curved as necessary to fit the contour of the interior of the vehicle instrument panel as shown in FIG. 9b.

With this arrangement, multiple data types can be provided to the airbag control unit, which can be used by a discrimination and decision algorithm. The algorithm uses the multiple data types to determine characteristics of the occupant moving into the one, or more, sensing fields, and to make a decision as to airbag deployment characteristics based on the occupant discrimination.

For example, proximity data for any of the multiple sensors can be provided; the first derivative of proximity, or velocity, can be provided; the second derivative, acceleration, can be provided; or the third derivative, commonly referred to as "jerk", can be provided. Additionally, thresholds can be assigned to each data type, within the discrimination and decision algorithm, which thus may consist of any combination of proximity, velocity, acceleration, or jerk thresholds.

Additionally, the four sensors 118, 118', 118", and 118'" can be assigned to triangle sets, as shown in FIG. 10, and triangulation methods can be applied to the proximity data to determine exact position of the occupant. FIG. 10 shows top triangle set 130 comprised of sensors 118, 118' and 118". Left triangle set 132 is comprised of sensors 118, 118" and 118'". Right triangle set 134 is comprised of sensors 118, 118' and 118'", and bottom triangle set 136 is comprised of sensors 118', 118" and 118'". This position data is then employed by the discrimination and decision algorithm as to airbag deployment characteristics.

The array of four sensors can be assigned to each of four triangle sets, as shown in FIG. 10. An example table of the data types available from the 4-sensor arrangement is shown below in Table 1.

TABLE 1

| Sensor set | Proximity | Threshold | 3D position | Velocity | Acceleration | Jerk |
| --- | --- | --- | --- | --- | --- | --- |
| Sensor 1 | X | X |  | X | X | X |
| Sensor 2 | X | X |  | X | X | X |
| Sensor 3 | X | X |  | X | X | X |
| Sensor 4 | X | X |  | X | X | X |
| Top Triangle | X | X | X | X | X | X |
| Left Triangle | X | X | X | X | X | X |
| Right Triangle | X | X | X | X | X | X |
| Bottom Triangle | X | X | X | X | X | X |

The third embodiment of the present invention is understood to include equivalent forms, methodologies, and applications. For example, the rigid or semi-rigid panel may be formed of non-conductive material to which is applied a conductive film thus forming the ground plane to which the capacitive sensor electrodes are applied; the conductive film may comprise the driven shield element, as described in the Vranish patent; the cutting edges of the panel may be any number of one or greater, e.g. an oval shape, rectangular shape, or polygonal shape; the reference sensor may be fabricated on a printed circuit board, on the sensor substrate, or in other manners that accomplish the intent of detecting changes in conductivity and/or thickness of the covering material; the positioning of the ASIC may be in any convenient location on or near the panel; the multiple sensors may comprise any number of sensors greater than one; the triangulation sets may use various assignments of the multiple sensors; the discrimination and decision algorithm may utilize any combination of data types, and may incorporate data from other sensors as well.

Figures 13A, 13B, 13C:
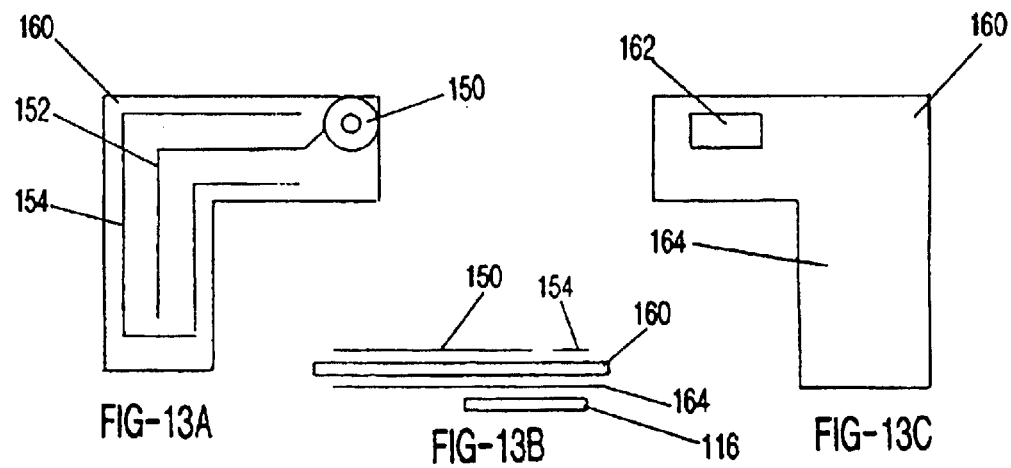
FIGS. 13a through 13c show a plan view, a cross-sectional view, and a reverse side view of a capacitive reference sensor adjacent to an occupant sensor in accordance with the present invention.

While FIG. 8c shows a reference sensor, comprised of electrodes 90 and 90', fabricated on one side of printed circuit board 116, the invention can also be practiced by fabricating the reference sensor on the same substrate as the capacitive occupant sensor, as shown in FIGS. 13a–13c. FIGS. 13a, 13b and 13c show a plan view, a cross-sectional view, and a reverse side view of substrate 160 with reference sensor 150 adjacent to capacitive occupant sensor comprised of drive electrode 152 and sense electrode 154. In the cross-sectional view shown in FIG. 13b, it can be seen that printed circuit board 116 is below monolithic ground 164 and substrate 160 is atop monolithic ground 164. Drive electrode 152 and sense electrode 154, which together form a capacitive sensor, are shown atop substrate 160, along with reference sensor 150 comprised of circular electrodes. In this form of the reference sensor, connections are provided either on a surface of substrate 160, or through substrate 160 to matching pins or thru-holes on printed circuit board 116 containing electronic parts. The physical connection of the reference electrodes to the electronic parts can be achieved by commonly available materials such as conductive epoxy glue. The electronic parts perform signal conditioning and output a usable signal which is representative of the reference condition. This reference condition is used to compensate for changes in sensor output which are not related to the proximity of an occupant, as for example change in the dielectric constant of the carrier materials due to changes in temperature or humidity.

As disclosed in applicant's U.S. Pat. No. 5,844,486 the opposite side of the sensor may be comprised of a monolithic ground area. In FIG. 13c, the grounding material is deleted for that portion 162 of monolithic ground area 164 on which electronics printed circuit board 116 is adhered, because printed circuit board 116 itself contains a grounded area similar in dimension to deleted monolithic ground area 162. This feature simplifies the interconnections between printed circuit board 116 and the sensor electrodes.

Attention is now turned to FIGS. 15a and 15b. Circular electrode arrangements have additional applications. Applicant's pending PCT patent application Ser. No. US97106822 teaches a capacitive occupant sensor for sunroof vehicles comprised of L-shaped electrodes around each of at least two corners of the sunroof, the disclosure of which is incorporated herein. In some applications or in some vehicles, it may be desired to employ one or more additional sensors to provide more accurate data relating to occupant head position. One geometry of capacitive sensor that achieves this objective is the fourth embodiment of the present invention, a "nested circle" design as shown in FIGS. 15a and 15b. FIG. 15a shows nested circle sensor 180 with drive electrode 186 and receive electrodes 182 and 188. Interconnects are shown at 184. FIG. 15b shows sunroof opening 190 of a vehicle with L-sensors 192 and 192' adjacent sunroof opening 190, and nested circle sensor 180 in between.

The challenge of accurately detecting head position using overhead-mounted capacitive sensors in a sunroof vehicle is that the sensors may not be positioned directly over the occupant's head, thus the signal is relatively weak and the resolved head position may be less than desired for the particular application. It is possible in most of these vehicles to improve the resolution by utilizing an array of two "L" sensors and one "nested circle" sensor, as shown in FIG. 15b.

Figure 16:
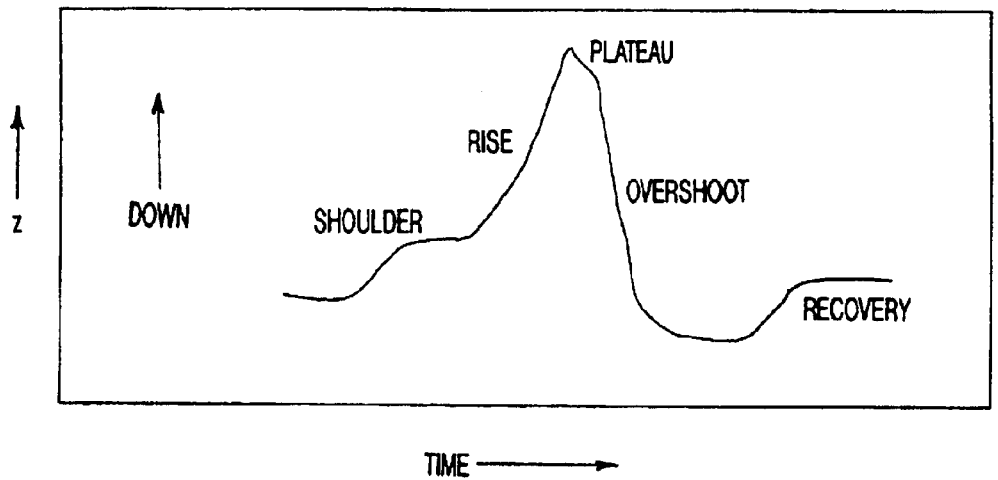
FIG. 16 shows the relationship of occupant head motion with respect to time during a sleep nod.
Figure 17:
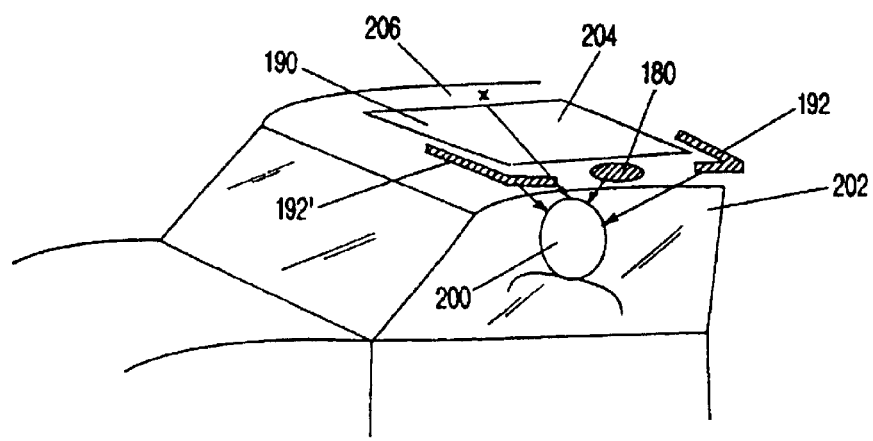
FIG. 17 shows an example of a dummy sensor input for triangulating vehicle occupant head position in accordance with the present invention.

Attention is now turned to FIG. 17. FIG. 17 shows a vehicle having sunroof 190, L-sensors 192 and 192', and nested circular sensor 180 adjacent sunroof 190. Dummy sensor 206 is located on the opposite side of sunroof 190. An occupant's head 200 is shown inside the vehicle beneath sunroof 190. The fixed proximity output from dummy sensor 206 is shown generally by the arrow at 204. The proximity outputs from the sensor array which is comprised of sensors 180, 192 and 192', is shown generally by the arrows at 202 into occupant's head 200. The head position triangulation algorithm which accepts proximities from these three sensors shown in FIG. 15b can be made more accurate by inputting data from dummy sensor 206 as shown at "x." Dummy sensor 206 is assumed to be located at an opposite side of sunroof 190, thus it is a much greater distance from occupant's head 200 than the active sensor array 180, 192, and 192'. Due to this distance, the output of dummy sensor 206 can be assumed a fixed value for all possible head positions of the occupant. A composite head position is derived, either by average or other statistical weighting methods, which incorporates the head position using dummy sensor 206 and the triangulated position of the active sensor array. An example is shown in FIG. 16. FIG. 16 depicts head motion of the occupant during a typical sleep nod and will be described further below. The method is analogous to the triangulation of occupant position from multiple triangles as described above with respect to FIG. 10. In this embodiment, the matrix of sensor proximity inputs to the triangulation algorithm are shown as "*" and the head position outputs are shown as P1, P2, P3, and P4 in Table 2. The final answer of head position is an average of the four values, which may be weighted according to sensor noise, vehicle geometry, experimental results, etc.:

TABLE 2

| | Algorithm Iteration | | | | |
|---|---|---|---|---|---|
| | 1 | 2 | 3 | 4 | Final Answer |
| S1 | * | | * | * | |
| S2 | * | * | | * | |
| S3 | * | * | * | | |
| Dummy | | * | * | * | |
| Head XYZ | P1 | P2 | P3 | P4 | weighted average of (P1:P4) |

In the present invention, the overhead capacitive sensing system includes a microprocessor with suitable memory to perform the comparison of actual vs. reference head position, and to record the typical head position of each occupant who operates a given vehicle. This data is used to identify the operator and to update the parameters which identify the non-impairment conditions of the operator.

Operator identification is achieved by comparing the head XYZ coordinates of a particular driver, to the XYZ coordinates of all drivers who have used the vehicle, and selecting the closest match. Given a head XYZ resolution of +/−0.25"; fore-aft seat positions of +/−5"; and operator seated height head positions of −1" to −9", a matrix of possible head positions of about 4×10×8=320 positions is obtained for each longitudinal "slice" of the vehicle. Some drivers may sit with their head slightly off-center so the possible head positions can be several times greater.

For a typical passenger car, relatively few operators use the vehicle while it is under a single ownership—using an example of a family of two adults and two teenage drivers, sharing three vehicles, most often one wage earner will drive one vehicle, the other wage earner will drive the second vehicle, and the two teen drivers share the remaining vehicle. Thus, it is a simple matter to compare an operator's actual head position to stored head positions for the vehicle and to infer which of the four drivers is operating the particular vehicle. Given this selection, it is also possible to select a history of time vs. position profiles for that operator, to update the profile, and then use the updated profile to better discriminate impairment from non-impairment, as described below in the example.

However, sensor output of any of the embodiments of the present invention, as well as other sensing systems, can be affected by temperature. For many types of sensors, it is difficult to compensate for exposure to extreme temperatures over long time periods. This is particularly true for transportation vehicles which may be serviceable for decades, are likely to be located in widely varying climates over the years, and thus are exposed to much more than day-night, week-to-week, and seasonal temperature extremes.

It is possible with some sensors to compensate for long term changes in output by employing a non-zero sensor response which is sensitive only to the effects of these temperature changes. If the non-zero response shifts slowly, in most cases it can be safely assumed this slow shift is due to temperature and not due to a sensed condition.

For a capacitive occupant sensor employed in a vehicle, this technique is particularly appropriate because the presence of an occupant will cause high frequency shifts in sensor output which are readily distinguishable from very low frequency shifts attributable to long-term temperature effects. This concept is depicted in FIG. 14. FIG. 14 shows long-term drift of capacitive signals due to temperature affects. The constant desired sensor output is shown by the constant horizontal line 172. Curved line 170 represents long-term drift of the capacitive signals due to temperature affects. A compensation algorithm can account for the difference between the long-term drift 170 and the constant desired sensor output 172 at those places denoted 174, 176 and 178.

Industrial Applicability

The invention is further illustrated by the following non-limiting example.

EXAMPLE

Applicant's issued U.S. Pat. No. 5,691,693, entitled "Impaired Transportation Vehicle Operator System," discloses a system for detecting impairment of the operating ability of transportation vehicle operators due to sleepiness, intoxication or other causes, and providing various alerting means of the impairment condition. The detection means is an array of capacitive coupling sensors placed in the vehicle headliner to sense operator head position and motion, the output of which is compared to normal head motion profiles and impaired head motion profiles. Using capacitive sensors of the present invention, an example of a mathematical description of the steep detection algorithm is described below.

Attention is now turned to FIG. 16. The signature head motion shown in FIG. 16 is an example of a characteristic sleep nod motion in the vertical (z) direction. Note that the more positive z-axis represents downward motion. The signature represents a sequence of physiological events. The shoulder is due to slow initial dropping of the head, followed by a sharp drop during a free-fall period (labeled as the rise). A plateau follows this as the head is caught. The head is brought up sharply with an overshoot, ending in final recovery to initial position.

The network architecture to represent this signature uses a typical four-dimensional feature vector:

$x(t)$=(shoulder/rise, plateau/rise, overshoot/rise, recovery/rise).

There is a feature vector associated with each sample time. These features are used to train a feature detection network.

The detection algorithm uses the following CNLS neural network:

N number of inputs to the feature vector
x input feature vector of dimension N
M number of kernels
$\beta$ kernel width parameter
$a_j$ adjustable linear parameter
$c_j$ j$\in$1,M characteristic input feature vector (exemplar)
$\phi_j$ the network
t time $$\rho_j(x) \equiv \exp[-\beta(x-c_j)^2]$$

The square in the argument is a dot product.

$$u_j(x) \equiv \frac{\rho_j(x)}{\sum_{j=1}^{M} \rho_j(x)} \quad \text{Kernel}$$

$$\varphi(x) \equiv \sum_{j=1}^{M} a_j u_j(x) \quad \text{Network Architecture}$$

Derivation of the architecture is based on an output variable y that depends stochastically on a stochastic input variable x. The expectation of y given x is $$E(y/x) = \int dy \, y \, Pr(y/x).$$

From Bayes' Theorem $$Pr(y/x) = \frac{Pr(y \wedge x)}{Pr(x)}$$

yields $$E(y/x) = \int dy \, y \frac{Pr(y \wedge x)}{Pr(x)}.$$

Use a kernel approximation for the probability distributions.

$$Pr(y \wedge x) \approx \frac{1}{M}\sum_{j=1}^{M} \psi_j(y)\rho_j(x)$$

where $\psi_i(y)$ is a local probability kernel with mean $a_j$ and $\rho_j(x)$ is a local probability kernel with a mean $c_j$. The input probability density is $$Pr(x) = \int dy\, Pr(y \wedge x) = \frac{1}{M}\sum_{j=1}^{M} \rho_j(x).$$

The expectation reduces to $$E(y/x) = \sum_{j=1}^{M} a_j u_j(x) \text{ where}$$

$$u_j(x) \equiv \frac{\rho_i(x)}{\sum_{j=1}^{M} \rho_j(x)}.$$

If we associate the network with the expectation, then the CNLS Net is recovered.

As a measurement of entropy, the quantity $u_j(x)$ can be interpreted as the probability that the output will be $a_j$ given the input was x. This allows us to define entropy as:

$$H(x) = -\sum_{j=1}^{M} u_j(x)\log_2[u_j(x)].$$

Entropy is a measure of the "normalcy" of a feature x. It is the negative of information, which is a measure of "surprise." The probability that a feature is unusual is $$Pr(surprise/x) = 2^{-H(x)}.$$

The probability that a feature is usual is $$Pr(normal/x) = 1 - 2^{-H(x)}.$$

The algorithm utilizes an anomaly detector to detect an inverse condition, e.g. head motion that does not look like a normal (alert) operator's head motion. Exemplars, $c_j$, form the centers of a set of kernels, $u_j(x)$. These kernels are used to calculate entropy, $H_A(x)$. The probability that a feature is anomalous is then $$Pr_A 2^{-H_A(x)}.$$

The algorithm also utilizes a "spike" detector based on exemplars of sleep nod behavior. The features from these nods were used as exemplars of sleepy behavior. These exemplars were used to calculate entropy $H_S(x)$. The probability that the feature has the proper shape for a sleep nod is given by $$Pr(shape/x) = 1 - 2^{-H_S(x)}.$$

An amplitude/width/sideways motion filter is applied so that the final probability that the feature looks like a spike is $$Pr = (1 - 2^{-H_S(x)})\theta$$

where $\theta$ is one if the vertical change in head motion is within a user specified window and the lateral change in head motion is less than a user specified threshold. Otherwise $\theta$ is zero.

The sleep detector is a composite of the anomaly detector and the spike detector. It is the probability that the feature does not look like an awake driver AND also does look like a feature associated with a sleep nod. This probability is $$Pr_D = 2^{-H_A(x)}\theta.$$

The anomaly detector can be customized for individual drivers, as discussed above.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A force detecting capacitive sensor comprising a plurality of sets of at least two electrodes integral with a transparency product, said electrodes having mutual capacitance affected by force acting against the transparency product, wherein said plurality is configured for discriminating different vehicle crash characteristics.

2. The sensor of claim 1 wherein at least two of said at least two electrodes are parallel with one another.

3. The sensor of claim 1 wherein at least two of said at least two electrodes are non-parallel with one another.

4. The sensor of claim 1 wherein at least one of said at least two electrodes comprises a conductive coating integral with the transparency product.

5. The sensor of claim 1 further comprising a vehicle occupant protection system comprised of at least one occupant restraint device which operates in conjunction with said sensor.

6. The sensor of claim 1 wherein said sensor distinguishes between a visibility condition and an object in proximity to the transparency product based on said sensor response.

7. The sensor of claim 6 further comprising a vehicle occupant protection system that operates in conjunction with said sensor upon detecting an object in proximity to the transparency product.

8. The sensor of claim 6 further comprising means for initiating a response to modify a detected visibility condition.

9. A capacitive sensor comprising at least two electrodes integral with a transparency product, said electrodes having mutual capacitance affected by force acting against the transparency product, wherein said sensor distinguishes between a visibility condition and an object in proximity to the transparency product based on said sensor response.

10. The sensor of claim 9 further comprising a vehicle occupant protection system that operates in conjunction with said sensor upon detecting an object in proximity to the transparency product.

11. The sensor of claim 9 further comprising means for initiating a response to modify a detected visibility condition.

12. A method of employing a force detecting capacitive sensor, the method comprising the steps of:

employing a plurality of sets of at least two electrodes integral with a transparency product, the electrodes having mutual capacitance affected by force acting against the transparency product; and configuring the plurality for discriminating different vehicle crash characteristics.

13. The method of claim 12 wherein in the employing step at least two of the at least two electrodes are parallel with one another.

14. The method of claim 12 wherein in the employing step at least two of the at least two electrodes are non-parallel with one another.

15. The method of claim 12 wherein in the employing step at least one of the at least two electrodes comprises a conductive coating integral with the transparency product.

16. The method of claim 15 further comprising the step of incorporating the sensor within a vehicle occupant protection system comprised of at least one occupant restraint device which operates in conjunction with the sensor.

17. The method of claim 12 additionally comprising the step of employing the sensor to distinguish between a visibility condition and an object in proximity to the transparency product based on the sensor response.

18. The method of claim 17 further comprising the step of incorporating the sensor within a vehicle occupant protection system that operates in conjunction with the sensor upon detecting an object in proximity to the transparency product.

19. The method of claim 17 further comprising the step of initiating a response to modify a detected visibility condition.

20. A method of employing a force detecting capacitive sensor, the method comprising the steps of:
- employing at least two electrodes integral with a transparency product, the electrodes having mutual capacitance affected by force acting against the transparency product; and
- distinguishing between a visibility condition and an object in proximity to the transparency product based on the sensor response.

21. The sensor of claim 20 further comprising the step of incorporating the sensor within a vehicle occupant protection system that operates in conjunction with the sensor upon detecting an object in proximity to the transparency product.

22. The sensor of claim 20 further comprising the step of initiating a response to modify a detected visibility condition.

* * * * *